3,033,863
18-NOR-CORTISONES AND PROCESS FOR
THEIR PREPARATION
Gaston Amiard, Noisy-le-Sec (Seine), and René Heymes,
Romainville (Seine), France, assignors, by mesne assignments, to Roussel-UCLAF, S.A., Paris, France, a corporation of France
No Drawing. Filed Oct. 10, 1961, Ser. No. 144,036
Claims priority, application France Oct. 20, 1960
14 Claims. (Cl. 260—239.55)

The invention relates to novel 16α-methyl-18-nor-cortisones having the formula

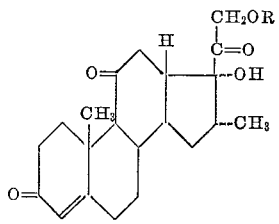

I wherein R is selected from the group consisting of hydrogen and an acyl radical of an organic carboxylic acid having 1 to 18 carbon atoms. The invention further relates to a novel process for the preparation of said compounds and novel intermediates thereof.

Compounds such as cortisone, hydrocortisone, prednisone, prednisolone and dexamethasone are known to possess glucocorticoidal activity, but it is also known that these products when administered over a period of time have undesirable side effects such as the retention of sodium and water and are ulcergenic. The compounds of Formula I possess glucocorticoidal activity with a minimum of side effects.

It is an object of the invention to provide novel 18-nor-cortisones of Formula I.

It is another object of the invention to provide a novel process for the preparation of 18-nor-cortisones of Formula I.

It is a further object of the invention to provide novel intermediates for 18-nor-cortisones of Formula I and particularly:

(a) 3-ethylenedioxy-17α-hydroperoxy - 16α - methyl-18-nor-pregnane-11,20-dione
(b) 3-ethylenedioxy-16α-methyl-18-nor-pregnane-17α-ol-11,20-dione
(c) 16α-methyl-18-nor-pregnane-17α-ol-3,11,20-trione
(d) 4β-bromo - 16α - methyl-18-nor-pregnane-17α-ol-3,11,20-trione
(e) 16α-methyl - 18 - nor-Δ⁴-pregnene-17α-ol-3,11,20-trione.

These and other objects and advantages will become obvious from the following detailed description.

The compounds of the invention have the formula

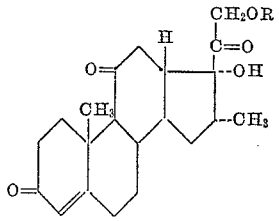

I wherein R is selected from the group consisting of hydrogen and an acyl radical of an organic carboxylic acid having 1 to 18 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, iso-butyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

The 16α-methyl-18-nor-cortisone and its esters are prepared by reacting 3-ethylenedioxy-16α-methyl-18-nor-pregnane-11,20-dione with oxygen in the presence of an alkali metal tertiary butylate to form 3-ethylenedioxy-17α - hydroperoxy - 16α - methyl-18-nor-pregnane-11,20-dione, reducing the latter to form 3-ethylenedioxy-16α-methyl-18-nor-pregnane-17α-ol-11,20-dione, hydrolyzing the latter under acidic conditions to form 16α-methyl-18-nor-pregnane-17α-ol-3,11,20-trione, reacting the latter with bromine to form 4β-bromo-16α-methyl-18-nor-pregnane-17α-ol-3,11,20-trione, dehydrobrominating the said 4β-bromo-steroid to form 16α-methyl-18-nor-Δ⁴-pregnene-17α-ol-3,11,20-trione, introducing a hydroxyl group in the 21-position of the latter to form 16α-methyl-18-nor-cortisone and recovering the latter. The 16α-methyl-18-nor-cortisone may be esterified in the 21-position by reacting the said cortisone with an esterifying agent such as an acid anhydride or acid halide.

16α-methyl-18-nor-pregnane-17α-ol-3,11,20-trione may also be produced by reacting 3-ethylenedioxy-16α-methyl-18-nor-pregnane-11,20-dione with acetic acid anhydride to form 3-ethylenedioxy-16α-methyl-20-acetoxy-18-nor-Δ¹⁷⁽²⁰⁾-pregnene-11-one reacting the latter with a peracid such as perbenzoic acid to form 3-ethylenedioxy-16α-methyl-17,20-epoxy-20-acetoxy-18-nor - pregnane-11-one and subjecting the latter to acid hydrolysis to form 16α-methyl-18-nor-pregnane-17α-ol-3,11,20-trione.

The introduction of the 21-hydroxy group may be performed chemically by reacting 16α-methyl-18-nor-Δ⁴-pregnene-17α-ol-3,11,20-trione with iodine in the presence of a mixture of calcium chloride and calcium oxide to form the corresponding 21-diiodo derivative of the said steroid, reacting the latter with an alkali metal salt of a lower alkanoic acid to form the corresponding 21-acyloxy derivative of said steroid and hydrolyzing the latter to the corresponding 21-hydroxy steroid. The 21-hydroxy steroid may also be formed by the action of diastases secreted by microorganisms such as *Colletotrichum lindemuthianum* (ATCC 12,611) as described in U.S. Patent No. 2,805,978.

A preferred mode of the process of the invention comprises reacting 3-ethylenedioxy-16α-methyl-18-nor-pregnane-11,20-dione with oxygen in the presence of potassium tertiary butylate at room temperature to form 3-ethylenedioxy - 17α - hydroperoxy - 16α - methyl - 18 - nor-pregnane-11,20-dione, reacting the latter with zinc and acetic acid to form 3-ethylenedioxy-16α-methyl-18-nor-pregnane-17α-ol-11,20-dione, hydrolyzing the latter with hydrochloric acid at reflux temperatures to form 16α-methyl-18-nor-pregnane-17α-ol-3,11,20-trione, reacting the latter with bromine in acetic acid to form 4β-bromo - 16α - methyl - 18 - nor - pregnane - 17α - ol-3,11,20-trione, dehydrobrominating the latter with a mixture of lithium bromide and lithium carbonate to form 16α - methyl - 18 - nor - Δ⁴ - pregnene - 17α - ol - 3,11,20-trione, introducing a hydroxyl group in the 21-position of the latter to form 16α-methyl-18-nor-cortisone and recovering the latter. The reaction schemes are outlined in Table I.

wherein R is selected from the group consisting of hydrogen and an acyl radical of an organic carboxylic acid having 1 to 18 carbon atoms.

The starting material, 3-ethylenedioxy-16α-methyl-18-nor-pregnane-11,20-dione, is prepared by reacting 3-ethylenedioxy-18-nor-Δ¹⁶-pregnene-11,20-dione described by Velluz et al. in Comptes Rendus Acad. Sc., vol. 250 (196), page 371, with a methyl magnesium halide in the presence of cuprous chloride.

In the following examples there are described sev-

TABLE I

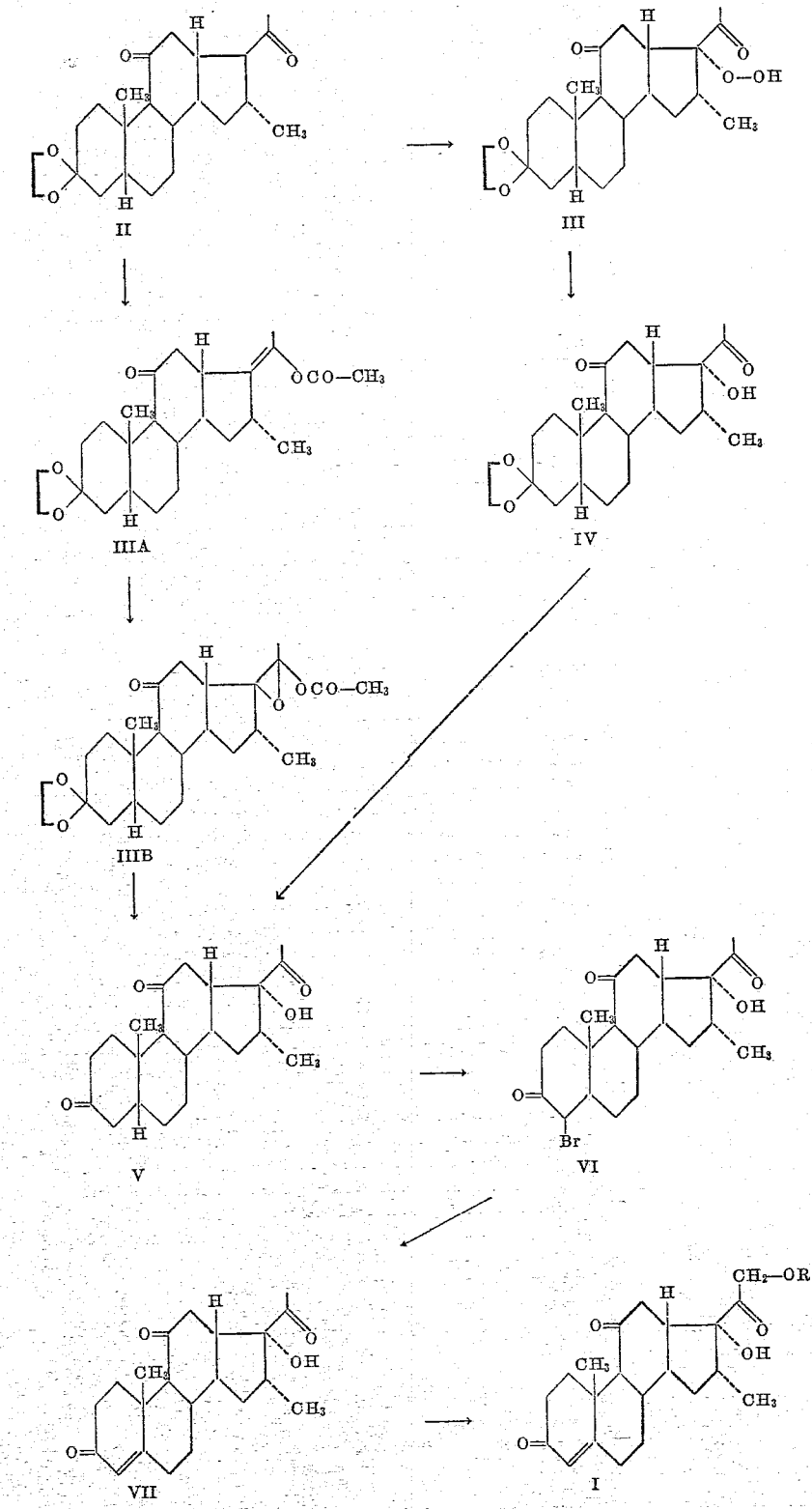

eral preferred embodiments to illustrate the invention. However, it should be understood that the invention is not intended to be limited to the specific embodiments. The melting points are instantaneous melting points as determined on the Maquenne block.

EXAMPLE I

*Preparation of 3-Ethylenedioxy-16α-Methyl-18-Nor-Pregnane-11,20-Dione, II*

To 40 cc. of ethereal solution of methylmagnesium iodide prepared from 2.2 gm. of magnesium and 9.0 cc. of methylene iodide, there was added, after cooling to 0° C., 120 cc. of tetrahydrofurane without allowing the interior temperature to mount above +5° C. A white precipitate was formed and after having cooled to 0° C., 500 mg. of cuprous chloride were added in two portions, cooling each time to 0° C., and then 14 gm. of 3-ethylenedioxy - 18 - nor - $\Delta^{16}$ - pregnene - 11,20 - dione in 65 cc. of tetrahydrofuran were introduced over several minutes under agitation. The reaction mixture was agitated for a period of forty-five minutes, then poured into a mixture of 300 gm. of ice and 15 gm. of ammonium chloride. After decantation, the solvents were removed under vacuum.

The residue comprising 3-ethylenedioxy-16α-methyl-18-nor-pregnane-11,20-dione crystallized. The aqueous phase resulting from the decantation was extracted with ether and the said pregnane as vacuum filtered was redissolved in combined ethereal extracts. The ethereal solution was washed with N/10 hyposulfite, then with water, dried over magnesium sulfate, passed in the carbon black and concentrated to a small volume. The product crystallized. Hexane was added, the ether was removed, the solution was iced, vacuum filtered, washed with hexane and dried. 12.4 gm. of 3-ethylenedioxy-16α-methyl-18-nor-pregnane-11,20-dione were obtained (being a yield of 85%) having a melting point of 148–150° C. and a specific rotation $[\alpha]_D^{20} = +32° \pm 2°$ (c.=1% in chloroform). The product was soluble in alcohol, acetone, benzene, chloroform, slightly soluble in ether, hexane, insoluble in water.

*Analysis.*—$C_{23}H_{34}O_4$; molecular weight=374.50. Calculated: C, 73.76%; H, 9.15%. Found: C, 73.9%; H, 9.1%.

This compound is not described in the literature.

EXAMPLE II

*Preparation of the Acetate of 16α-Methyl-18-Nor-Cortisone*

*Step A.*—*Preparation of 3-ethylenedioxy-16α-methyl-17α-hydroperoxy-18-nor-pregnane-11,20-dione.*—2 gm. of potassium were dissolved in 170 cc. of tertiary butanol under agitation and an atmosphere of nitrogen. The mixture was cooled to 25° C. and 10 gm. of 3-ethylenedioxy-16α-methyl-18-nor-pregnane-11,20-dione were introduced. Oxygen was bubbled into the mixture for a period of forty-five minutes until the absorption of about 650 cc. of oxygen. A solution of 3-ethylenedioxy-17α-hydroperoxy-16α-methyl-18-nor-pregnane-11,20-dione was thus obtained.

*Step B.*—*Preparation of 3-ethylenedioxy-16α-methyl-18-nor-pregnane-17α-ol-11,20-dione.*—To the refrigerated solution obtained in Step A were added 60 cc. of acetic acid and then 20 gm. of zinc. The mixture was agitated for a period of twenty minutes at room temperature, then heated to 60° C. for a period of fifteen minutes. The zinc was filtered, water was added and the organic solvents were eliminated by distillation. After alkalinization by addition of sodium hydroxide solution, the mixture was extracted with ether. The ethereal solution was washed with water, dried, evaporated to dryness and 3-ethylenedioxy-16α-methyl-18 - nor - pregnane - 17α-ol-11,20-dione was obtained as a residue. This compound was used as such for the next step of the synthesis.

*Step C.*—*Preparation of 16α-methyl-18-nor-pregnane-17α-ol-3,11,20-trione.*—The compound prepared in Step B was dissolved in 60 cc. of acetone and 12 cc. of 5 N hydrochloric acid were added thereto. The mixture was heated to reflux for a period of five minutes, 20 cc. of water were added and the acetone was removed under vacuum. 16α-methyl-18-nor-pregnane-17α - ol - 3,11,20-trione crystallized. The crystals were vacuum filtered washed with water, dissolved in methylene chloride, treated with animal black, filtered and concentrated to a small volume. On the addition of hot ether, 16α-methyl-18-nor-pregnane-17α-ol-3,11,20-trione precipitated. The crystals were vacuum filtered to give 4.32 gm. of product (being 45% with reference to 3-ethylenedioxy-16α-methyl-18-nor-pregnane-11,20-dione), melting at 202° C. and directly utilizable for the next step of the synthesis.

By evaporation of the mother liquors, it was possible to recover 1.5 gm. of 16α-methyl-18-nor-pregnane-3,11,20-trione.

For analysis, the 16α-methyl-18-nor-pregnane-17α-ol-3,11,20-trione was purified by recrystallization from methylene chloride to give a sample melting at 204–206° C. and having a specific rotation $[\alpha]_D^{20} = +21°$ (c.=1% in chloroform). The product occurred in the form of colorless crystals. It was very soluble in chloroform, soluble in alcohol and acetone and slightly soluble in ether and insoluble in water.

*Analysis.*—$C_{21}H_{30}O_4$; molecular weight = 346.45. Calculated: C, 72.80%; H, 8.73%. Found: C, 72.6%; H, 8.8%.

The infrared spectra confirmed the presence of a hydroxyl by a band at 3607 cm.$^{-1}$.

This compound is not described in the literature.

*Step D.*—*Preparation of 4β-bromo-16α-methyl-18-nor-pregnane-17α-ol-3,11,20-trione.*—4 gm. of 16α-methyl-18-nor-pregnane-17α-ol-3,11,20-trione were dissolved in 90 cc. of anhydrous chloroform. 9 cc. of acetic acid were added and then 11.5 cc. of a solution cooled to −60° C. of bromine in acetic acid were introduced drop by drop. The solution was prepared from 14.55 gm. of bromine, 7.3 gm. of hydrobromic acid and a sufficient quantity of acetic acid in order to give a volume of 90 cc. The reaction mixture was agitated for a period of thirty minutes at −60° C. and then 2.8 gm. of sodium acetate containing 3 mols of water in 15 cc. of water were added thereto. The mixture was poured onto a mixture of water and ice and extracted with chloroform. The extracts were washed with a solution of sodium bicarbonate and water, then dried over magnesium sulfate. The solution was concentrated to a small volume, vacuum filtered and 3.8 gm. (being 80%) of 4β-bromo-16α-methyl-18-nor-pregnane-17α-ol-3,11,20-trione were obtained which was utilized in the raw state for the next step of the synthesis.

This compound is not described in the literature.

By treatment with zinc and acetic acid, 0.44 gm. of the 16α-methyl-18-nor-pregnane-17α - ol - 3,11,20 - trione were recovered from the mother liquors.

*Step E.*—*Preparation of 16α-methyl-18-nor-$\Delta^4$-pregnene-17α-ol-3,11,20-trione.*—3.8 gm. of 4β-bromo-16α-methyl-18-nor-pregnane-17α-ol-3,11,20-trione were introduced into 38 cc. of anhydrous dimethlformamide. 2 gm. of lithium bromide and 1 gm. of lithium carbonate were added and the mixture was heated under agitation and an atmosphere of nitrogen to 135° C. for a period of forty minutes. After cooling and addition of water and several cc. of acetic acid, the mixture was extracted with methylene chloride. The extracts were washed with water, dried and concentrated under vacuum. The 16α-methyl-18-nor-$\Delta^4$-pregnene-17α-ol-3,11,20 - trione crystallized and was recovered by vacuum filtration. 2.5 gm. (being a yield of 81%) of raw product were obtained which was recrystallized from methanol, yielding a product having a melting point of 222–224° C. and a specific rotation $[\alpha]_D^{20} = +165° \pm 2°$ (c.=1% in chloroform). The product occurred in the form of colorless leaflets, very soluble in chloroform, soluble in acetone, very slightly soluble in alcohol and ether and insoluble in water.

*Analysis.* — $C_{21}H_{28}O_4$; molecular weight = 344.44. Calculated: C, 73.22%; H, 8.19%. Found: C, 73.0%; H, 8.2%.

Ultraviolet spectra: $\lambda_{max}$ 238 m$\mu$, $\epsilon$=15,100.

This compound is not described in the literature.

*Step F.—Preparation of 16α-methyl-21-diiodo-18-nor-Δ⁴-pregnene-17α-ol-3,11,20-trione.* — 850 mg. of 16α-methyl-18-nor-Δ⁴-pregnene-17α-ol-13,11,20-trione were introduced in 7.5 cc. of methanol. 850 mg. of quick lime and 3 cc. of methanol containing 10% calcium chloride were added and the mixture was cooled to −10° C. To the mixture were added 1.27 gm. of pulverized iodine and the mixture was agitated in a closed vessel for a period of one hour. The draw 21-diiodo-16α-methyl-18-nor-Δ⁴-pregnene-17α-ol-3,11,20-trione formed was vacuum filtered. The residue was washed with a dilute solution of acetic acid and with water and utilized without purification for the next step of the synthesis.

This compound is not described in the literature.

*Step G.—Preparation of the acetate of 16α-methyl-18-nor-cortisone.*—The 21-iodo derivative prepared in Step F was dissolved in acetone. 0.2 cc. of acetic acid and 3 gm. of potassium acetate were added. The mixture was heated to reflux for a period of one hour and a half and then 10 cc. of water were added and the acetone was removed under vacuum. The acetate of 16α-methyl-18-nor-cortisone crystallized. The product was vacuum filtered, washed with water, dried, and taken up by a mixture of acetic acid and acetone. 300 mg. of zinc were added. The mixture was refluxed for a period of several minutes. The mixture was treated with animal black, filtered, concentrated to a small volume and vacuum filtered. The product was recrystallized from aqueous acetone to give a product melting at 247–248° C. and having a specific rotate $[\alpha]_D^{20} = +115° \pm 2°$ (c.=1% in chloroform). The product occurred in the form of square leaflets, very soluble in chloroform, soluble in acetone, very slightly soluble in alcohol and insoluble in water and ether.

*Analysis.*—$C_{23}H_{30}O_6$; molecular weight=402.47. Calculated: C, 68.63%; H, 7.51%. Found: C, 68.5%; H, 7.7%.

Ultraviolet spectra: $\lambda_{max}$ 238 m$\mu$, $\epsilon$=15,000.

This compound is not described in the literature.

EXAMPLE III

*Preparation of 16α-Methyl-18-Nor-Cortisone*

1 gm. of the acetate of 16α-methyl-18-nor-cortisone produced in Example II was introduced into 10 cc. of methanol. 0.1 cc. of a normal solution of sodium methylate in methanol was added and the mixture was heated at reflux for a period of fifteen minutes under nitrogen. After neutralization and dilution with an equal volume of water, the methanol was removed under vacuum and the 16α-methyl-18-nor-cortisone was recovered.

This compound is not described in the literature.

EXAMPLE IV

*Preparation of 16α-methyl-18-Nor-Cortisone by Biological Hydroxylation in the 21-Position*

*Colletotrichum lindemuthianum* (ATCC 12,611) was cultivated for a period of ten days at 24° on an agar medium containing 2% of saccharose and 20% of potato extract. The conidies were collected in distilled water. The suspension obtained was used to sterilely inoculate a 1-liter Erlenmeyer flask containing 100 cc. of a medium composed as follows:

| | Grams |
|---|---|
| Pure glucose | 10 |
| Malt extract | 5 |
| Soy bean meal | 10 |
| Sodium chloride | 5 |
| Dry corn steep | 5 |
| Calcium carbonate | 1 |
| Tap water to make 1,000 cc. | |

The pH of this medium was previously adjusted to 6.8–7.0 by potassium hydroxide and it was sterilized by heating thirty minutes to a temperature of 120° C. After five days of culturing at 25° on a shaking apparatus (85 strokes per minute, 8 cc. stroke), 10 cc. of an acetonic solution containing 1% of 16α-methyl-18-nor-Δ⁴-pregnene-17α-ol-3,11,20-trione obtained according to Example II, were added to 1,000 cc. of culture. A new incubation of twenty-four hours gave 16α-methyl-18-nor-cortisone as is evidenced by chromatographic determinations on paper which were effected as follows on 50 cc. of culture broth.

The broth was filtered and the mycelium washed two times with 5 cc. of acetone which was added to the filtrate. The mycelium was next extracted with 2 aliquots of 50 cc. of chloroform and the preceding filtrate was extracted with these 100 cc. of chloroform. Then the extractions were made again two times with 20 cc. of chloroform each time. The chloroformic extracts were combined and were washed first with an aqueous solution of sodium bicarbonate, then with water and dried over magnesium sulfate. The solutions were then evaporated to dryness under vacuum. The residue was taken up with 1 cc. of methanol and subjected to paper chromatography. Previous to the chromatographic adsorption, the paper strip was immersed in a solution of 30% propylene glycol.

After allowing it to drip, the steroid is chromatographed with toluene saturated with propylene glycol and a development of eight to fifteen hours is effected. The detection of spots was made by the color reaction of Mader et al. (Anal. Chem. 1952, 24, p. 666) with triphenyl tetrazolium chloride which gives a red coloration on a white foundation with steroids possessing the ketol function R—CO—CH$_2$OH.

Various modifications of the process of the invention may be made without departing from the spirit or scope thereof, and it is to be understood that the invention is to be limited only as defined in the appended claims.

We claim:

1. 3-ethylenedioxy - 16α - methyl-17α-hydroperoxy-18-nor-pregnane-11,20-dione.
2. 3-ethylenedioxy - 16α - methyl-18-nor-pregnane-17α-ol-11,20-dione.
3. 16α-methyl - 18 - nor-pregnane-17α-ol-3,11,20-trione.
4. 4β - bromo - 16α - methyl-18-nor-pregnane-17α-ol-3,11,20-trione.
5. 16α - methyl - 18 - nor-Δ⁴-pregnene-17α-ol-3,11,20-trione.
6. 16α-methyl-21-diiodo - 18 - nor-Δ⁴-pregnene-17α-ol-3,11,20-trione.
7. A process for the preparation of compounds having the formula

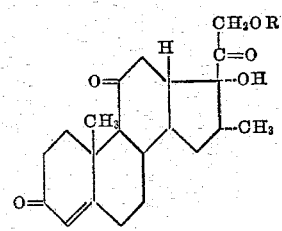

wherein R is selected from the group consisting of hydrogen and an acyl radical of an organic carboxylic acid having 1 to 18 carbon atoms which comprises oxidizing 3-ethylenedioxy - 16α - methyl-18-nor-pregnane-11,20-dione with oxygen in the presence of an alkali metal tertiary butylate to form 3-ethylenedioxy-17α-hydroperoxy-16α-methyl-18-nor-pregnane-11,20-dione, reducing the latter to form 3-ethylenedioxy-16α-methyl-18-nor-pregnane-17α-ol-11,20-dione, hydrolyzing the latter under acidic conditions to form 16α-methyl-18-nor-pregnane-17α-ol-3,11,20-trione, reacting the latter with bromine to form 4β-bromo-16α-methyl-18-nor-pregnane-17α-ol-3,11,20-trione, dehydrobrominating the latter to form 16α-methyl-18-nor-Δ⁴-pregnene-17α-ol-3,11,20-trione, introducing a hydroxyl group in the 21-position by microbiological means with *Colletotrichum lindemuthianum* to form 16α-methyl-18-nor-cortisone and recovering a compound of the above formula.

8. The process of claim 7 wherein the oxidation is effected with oxygen in the presence of potassium tertiary butylate.

9. The process of claim 7 wherein the reduction is effected with zinc and acetic acid.

10. The process of claim 7 wherein the dehydrobromination is effected with a mixture of lithium bromide and lithium carbonate.

11. A process for the preparation of a compound having the formula

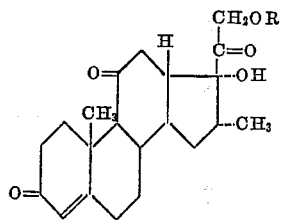

wherein R is selected from the group consisting of hydrogen and an acyl radical of an organic carboxylic acid having 1 to 18 carbon atoms which comprises oxidizing 3-ethylenedioxy-16α-methyl-18-nor-pregnane-11,20-dione wtih oxygen in the presence of potassium tertiary butylate to form 3-ethylenedioxy-17α-hydroperoxy-16α-methyl-18-nor-pregnane-11,20-dione, reducing the latter with zinc and acetic acid to form 3-ethylenedioxy-16α-methyl-18-nor-pregnane-17α-ol-11,20-dione, hydrolyzing the latter under acidic conditions to form 16α-methyl-18-nor-pregnane-17α-ol-3,11,20-trione, reacting the latter with bromine in acetic acid to form 4β-bromo-16α-methyl-18-nor-pregnane-17α-ol-3,11,20-trione, dehydrobrominating the latter in the presence of a mixture of lithium bromide and lithium carbonate to form 16α-methyl-18-nor-Δ⁴-pregnene-17α-ol-3,11,20-trione, reacting the latter with iodine in the presence of a mixture of calcium oxide and calcium chloride to form 21-diiodo-16α-methyl-18-nor-Δ⁴-pregnene-17α-ol-3,11,20-trione, reacting the latter with an alkali metal salt of a lower alkanoic acid to form 21-acyloxy-16α-methyl-18-nor-Δ⁴-pregnene-17α-ol-3,11,20-trione, hydrolyzing the latter to form 16α-methyl-18-nor-cortisone and recovering a compound of the above formula.

12. A process for the preparation of a compound having the formula

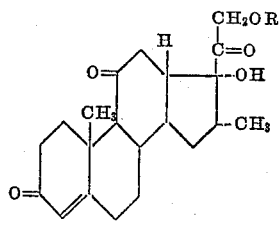

wherein R is selected from the group consisting of hydrogen and an acyl radical of an organic carboxylic acid having 1 to 18 carbon atoms which comprises oxidizing 3-ethylenedioxy-16α-methyl-18-nor-pregnane-11,20-dione with oxygen in the presence of potassium tertiary butylate to form 3-ethylenedioxy-17α-hydroperoxy-16α-methyl-18-nor-pregnane-11,20-dione, reducing the latter with zinc and acetic acid to form 3-ethylenedioxy-16α-methyl-18-nor-pregnane-17α-ol-11,20-dione, hydrolyzing the latter under acidic conditions to form 16α-methyl-18-nor-pregnane-17α-ol-3,11,20-trione, reacting the latter with bromine in acetic acid to form 4β-bromo-16α-methyl-18-nor-pregnane-17α-ol-3,11,20-trione, dehydrobrominating the latter in the presence of a mixture of lithium bromide and lithium carbonate to form 16α-methyl-18-nor-Δ⁴-pregnene-17α-ol-3,11,20-trione, subjecting the latter to the action of diastases secreted by *Colletotrichum lindemuthianum* to form 16α-methyl-18-nor-cortisone and recovering a compound of the above formula.

13. A process for the preparation of 16α-methyl-18-nor-pregnane-17α-ol-3,11,20-trione which comprises reacting 3-ethylenedioxy-16α-methyl-18-nor-pregnane-11,20-dione with acetic acid anhydride to form 3-ethylenedioxy-16α-methyl-20-acetoxy-18-nor-Δ¹⁷⁽²⁰⁾-pregnene-11-one reacting the latter with perbenzoic acid to form 3-ethylenedioxy-16α-methyl-17,20-epoxy-20-acetoxy-18-nor-pregnane-11-one and subjecting the latter to acid hydrolysis to form 16α-methyl-18-nor-pregnane-17α-ol-3,11,20-trione.

14. A process for the preparation of compounds having the formula

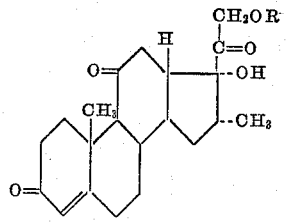

wherein R is selected from the group consisting of hydrogen and an acyl radical of an organic carboxylic acid having 1 to 18 carbon atoms which comprises oxidizing 3-ethylenedioxy-16α-methyl-18-nor-pregnane-11,20-dione with oxygen in the presence of an alkali metal tertiary butylate to form 3-ethylenedioxy-17α-hydroperoxy-16α-methyl-18-nor-pregnane-11,20-dione, reducing the latter to form 3-ethylenedioxy-16α-methyl-18-nor-pregnane-17α-ol-11,20-dione, hydrolyzing the latter under acidic conditions to form 16α-methyl-18-nor-pregnane-17α-ol-3,11,20-trione, reacting the latter with bromine to form 4β-bromo-16α-methyl-18-nor-pregnane-17α-ol-3,11,20-trione, dehydrobrominating the latter to form 16α-methyl-18-nor-Δ⁴-pregnene-17α-ol-3,11,20-trione, reacting the latter with iodine in the presence of a mixture of calcium oxide and calcium chloride to form 21-diiodo-16α-methyl-18-nor-Δ⁴-pregnene-17α-ol-3,11,20-trione, reacting the latter with an alkali metal salt of a lower alkanoic acid to form 21-acyloxy-16α-methyl-18-nor-Δ⁴-pregnene17α-ol-3,11,20-trione and hydrolyzing the latter to form 16α-methyl-18-nor-cortisone.

References Cited in the file of this patent
UNITED STATES PATENTS
2,961,441   Bogert et al. _____ Nov. 22, 1960

OTHER REFERENCES
Arth et al.: J.A.C.S., June 20, 1958, page 3160.